US011265827B1

(12) United States Patent
Bhattacharyya et al.

(10) Patent No.: US 11,265,827 B1
(45) Date of Patent: Mar. 1, 2022

(54) CONSERVING BATTERY LIFE DURING BLUETOOTH DEVICE LOCALIZATION

(71) Applicant: Cisco Technology, Inc., San Jose, CA (US)

(72) Inventors: Abhishek Bhattacharyya, Dublin, CA (US); Huy P. Tran, Santa Clara, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 17/304,473

(22) Filed: Jun. 22, 2021

(51) Int. Cl.
*H04W 52/36* (2009.01)
*H04W 52/02* (2009.01)
*H04W 4/029* (2018.01)
*H04W 4/80* (2018.01)

(52) U.S. Cl.
CPC ......... *H04W 52/367* (2013.01); *H04W 4/029* (2018.02); *H04W 4/80* (2018.02); *H04W 52/0209* (2013.01)

(58) Field of Classification Search
CPC ..... H04W 52/367; H04W 4/029; H04W 4/80; H04W 52/0209
See application file for complete search history.

(56) References Cited

U.S. PATENT DOCUMENTS

| 10,270,642 | B2* | 4/2019 | Zhang | G01S 13/003 |
| 10,575,138 | B1* | 2/2020 | Klinkner | G08B 21/24 |
| 10,735,909 | B1* | 8/2020 | Klinkner | H04W 4/021 |
| 2012/0001728 | A1* | 1/2012 | Janiszewski | G08B 13/1427 340/8.1 |
| 2013/0029685 | A1* | 1/2013 | Moshfeghi | G06Q 20/409 455/456.1 |
| 2016/0302060 | A1* | 10/2016 | Agardh | H04L 12/2809 |
| 2017/0289785 | A1* | 10/2017 | Krishnakumar | H04W 4/80 |
| 2018/0199149 | A1* | 7/2018 | Mallya | G01S 5/02 |

(Continued)

OTHER PUBLICATIONS

Qureshi UM, Umair Z, Hancke GP. Evaluating the Implications of Varying Bluetooth Low Energy (BLE) Transmission Power Levels on Wireless Indoor Localization Accuracy and Precision. Sensors (Basel). 2019;19(15):3282. Published Jul. 25, 2019. doi:10.3390/s19153282.

(Continued)

*Primary Examiner* — David Bilodeau
(74) *Attorney, Agent, or Firm* — Patterson + Sheridan, LLP

(57) ABSTRACT

Various embodiments herein disclose improving battery life while determining a location of a Bluetooth device. A corresponding method comprises receiving an identifier for a Bluetooth Low Energy (BLE) device to locate in an environment comprising a plurality of access points (APs). The method further comprises identifying a first AP of the plurality of APs communicating with the BLE device at a first power level. The method also comprises instructing, using the first AP, the BLE device to increase a transmission power level of the BLE device until a threshold number of APs of the plurality of APs, including the first AP, receive communications from the BLE device. The method additionally comprises receiving an RSSI value from each of the threshold number of APs based on the communications from the BLE device. The method also comprises computing a location of the BLE device in the environment based on the RSSI values.

20 Claims, 7 Drawing Sheets

(56) References Cited

U.S. PATENT DOCUMENTS

2019/0124474 A1* 4/2019 Bloechl ................ H04W 24/08
2020/0296671 A1* 9/2020 Bhattacharyya ........ H04W 4/38

OTHER PUBLICATIONS

Garcia-Espinosa, Eduardo & Longoria-Gandara, Omar & Pegueros-Lepe, Ioseth & Veloz, Arturo. (2018). Power Consumption Analysis of Bluetooth Low Energy Commercial Products and Their Implications for IoT Applications. Electronics. 7. 386. 10.3390/electronics7120386.
P. Kindt, D. Yunge, R. Diemer, S. Chakraborty, "Precise Energy Modeling for the Bluetooth Low Energy Protocol," Institute for Real-Time Computer Systems, Technische Universität München, dated Mar. 13, 2014, pp. 1-46.
Abbas Z, Yoon W. A Survey on Energy Conserving Mechanisms for the Internet of Things: Wireless Networking Aspects. Sensors. 2015; 15(10):24818-24847. https://doi.org/10.3390/s151024818.

* cited by examiner

CONSERVING BATTERY LIFE DURING BLUETOOTH DEVICE LOCALIZATION

TECHNICAL FIELD

Embodiments presented in this disclosure generally relate to identifying and tracking locations of electronic devices. More specifically, embodiments disclosed herein relate to locating electronic devices that communicate via Bluetooth communication protocols.

BACKGROUND

Many mobile electronic devices, such as Bluetooth Low Energy (BLE) devices, are battery-powered wireless devices. Such devices may often be used as beacons to identify locations of items. For example, a BLE device can be embedded in or be part of an item (such as a crate, pallet, or the like) or be used to track the location of the item during transportation between facilities, storage within a facility, and so forth. To enable such location identification and tracking capabilities, the BLE device transmits periodic advertisements indicating its location at the time the advertisement is transmitted at a specified period and power level to receiving devices, such as other BLE devices, access points (APs), or the like. In some embodiments, to enable triangulation, trilateration, or the like, to identify the location of the BLE device when the BLE device transmitted the advertisement, the advertisement should be received by multiple APs. Such periodic advertisement transmissions at power levels sufficient to enable multiple APs to receive the periodic advertisements from the BLE device may utilize a large amount of power relative to the power capabilities of the battery-powered BLE device. For example, transmitting advertisements at a sufficient power level to enable multiple APs to receive the advertisements can expend the battery of the BLE device too quickly and create interference in an environment, which is generally undesirable.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
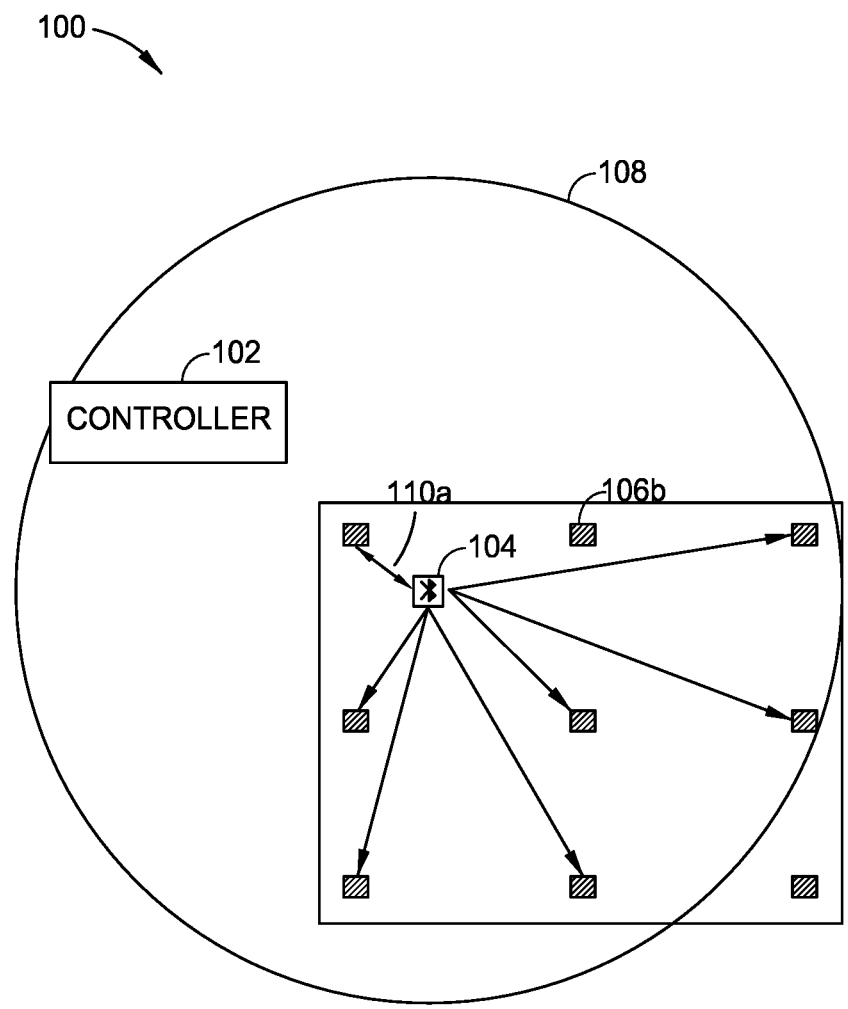
FIG. 1 depicts an example embodiment of a location system that identifies a location of a Bluetooth Low Energy (BLE) device based on one or more advertisements transmitted by the BLE device and received by a number of access points (APs).

Various embodiments disclosed herein include apparatuses, systems, devices, and methods for identifying, tracking, and/or monitoring a location of an electronic device, such as a Bluetooth Low Energy (BLE) beacon device. A method comprises, receiving an identifier for a BLE device to locate in an environment comprising a plurality of access points (APs). The method further comprises identifying a first AP of the plurality of APs that is communicating with the BLE device at a first power level. The first AP may be communicating with the BLE device to configure the BLE device for communications with the plurality of APs, and so forth. The method additionally comprises instructing, using the first AP, the BLE device to increase a transmission power level at which the BLE broadcasts one or more advertisements until a threshold number of APs of the plurality of APs receive the broadcast one or more advertisements from the BLE device at or with a minimum received signal strength indicator (RSSI) value, as measured at each receiving AP. The threshold number of APs includes the first AP. The method also comprises receiving an RSSI value as measured by each of the threshold number of APs for the advertisements from the BLE device from each of the threshold number of APs. Based on these received RSSI values, the method comprises computing the location of the BLE device in the environment based on the RSSI values, or similar values.

In accordance with some embodiments, a wireless controller comprises one or more processors and a memory storing instructions that, when executed by the one or more processors, cause the wireless controller to perform a method of locating a BLE device. In accordance with some embodiments, a non-transitory computer readable storage medium has stored therein instructions, which, when executed by one or more processors of a wireless controller, cause the wireless controller to perform or cause performance of any of the methods described herein. In accordance with some embodiments, a wireless controller includes: a communication interface, one or more processors, and a non-transitory memory for performing or causing performance of any of the methods described herein.

Example Embodiments

Battery-powered wireless devices, such as BLE devices or tags (referred to herein as BLE devices), may be used for various purposes, such as sensor telemetry, asset tracking, people tracking, and the like. In some embodiments, the BLE device corresponds to an Internet of Things (IoT) device. To accomplish such purposes, the BLE devices broadcast periodic or event-driven advertisements that contain, for example, device identifying data or data measured by one or more sensors onboard the BLE device. Because these BLE devices are battery-powered, they can be mobile and have increased potential use cases as compared to corresponding wired devices. However, one factor influencing a battery life of such BLE devices is a transmission power level and frequency of the BLE device. For example, a BLE card-type device that transmits advertisements every second at −12 decibels per milliwatt (dBm) or less and that is powered by two coin-cell batteries can last for approximately 2 years. On the other hand, the same BLE card-type device that transmits the advertisements every second at 4 dBm or more may last for only approximately 9 months. Thus, relatively minor changes in the transmission power level of the BLE device can drastically impact the battery life of the BLE device, which can influence maintenance costs associated with the BLE device.

Furthermore, an example wireless communication system comprising a controller and a plurality of APs may identify the location of the BLE device using trilateration, triangulation, or the like, based on corresponding measurements of the RSSI of the advertisements (or other aspects of the advertisements) received at or by the APs. Based on such methodologies, a location accuracy of the identified location for the BLE device is related to the RSSI (or other aspects) for the advertisement received from the BLE device at the AP, such that the higher the RSSI for the advertisement received at the APs, the greater the location accuracy of the location of the BLE device in the environment, and so forth. Where the RSSI is a measure of the signal strength of the corresponding advertisement, a higher RSSI measured at the AP corresponds to a higher transmit power level at the BLE device. However, the higher transmit power level at the BLE device, the faster the BLE device battery(ies) drains. Thus, the BLE location accuracy and the BLE device battery life are relatively inversely related. Furthermore, because the environment in which the BLE device will likely be used is often dense with a number of other wireless devices, high transmission power levels can create interference, increasing errors and worsening signal quality for other BLE devices in the environment.

One embodiment presented in this disclosure that cures, or at least mitigates, the deficiency of the example wireless communication system introduced above outlines a method of locating a BLE device, as introduced above, in communication with a first AP of the wireless communication system introduced above. The first AP may communicate with the BLE device while the BLE device is configuring itself to communicate with the wireless communication system. As part of this configuration, the first AP may instruct the BLE device to communicate at a particular initial or minimum transmission power level, for example, for advertisement transmissions. The method of locating the BLE device may comprise instructing the BLE device, via the first AP, to increase its transmission power from the initial transmission power level until a threshold number of APs receive the advertisement transmitted by the BLE device. Once the threshold number of APs receive the BLE device's transmitted advertisement, these APs can provide received signal information (for example, RSSI measurements, timing measurements, and the like) to the controller for a determination of a location of the BLE device.

More specifically, in such an embodiment, the controller identifies the BLE device to locate and identifies the first AP that is communicating with the BLE device to locate. This first AP communicating with the BLE device may be the AP that the BLE device connected to for configuration and similar purposes. The controller may identify the initial or first transmission power level of the BLE device based on reports from the first AP, such as reported RSSI values for advertisement transmissions received from the BLE device by the first AP. The controller also identifies whether additional APs are receiving the advertisement transmissions from the BLE device once the BLE device starts broadcasting advertisements and similar messages based on which the location of the BLE device can be determined.

Where the controller determines that only the first AP is communicating with or receiving advertisements broadcast by the BLE device, the controller requests the first AP to instruct the BLE device to incrementally increase a transmission power of the BLE device until a threshold number of APs (such as 3 or 4 total APs) are able to receive one or more advertisements broadcast by the BLE device. Each of the threshold number of APs then communicates corresponding RSSI values (or corresponding measurements) for one or more advertisements received from the BLE device to the controller. The controller can then identify the location of the BLE device, for example, based on the RSSI values reported by each AP. In some embodiments, other parameters associated with the received one or more advertisements can be used to identify the location of the BLE device. Furthermore, the location of the BLE device may be identified with respect or relative to one or more of the APs that received the one or more advertisements broadcast by the BLE device. In some embodiments, the threshold number of APs varies based on the method of location determination used to identify the location of the BLE device. In some embodiments, where a previous location for the BLE device is known, the previous location and a time between when the previous location was determined and a current time can be used in determining the current location of the BLE device.

In one use case, the BLE device is configured to transmit telemetry data at an optimal transmission power selected such that at least the first AP receives transmissions from the BLE device.

In another use case, the BLE device provides localization and tracking information with an updated optimal transmission power selected such that a sufficient number of APs measure RSSI values for the transmission from the BLE device, and where the measured RSSI values meet or exceed a minimum RSSI threshold. Because APs in an environment are often deployed in a grid pattern, the minimum number of APs that receive transmissions from the BLE devices at acceptable or the threshold RSSI values (as measured by the APs) to determine the location of the BLE devices may be three or four (for example, in trilateration or triangulation methods of location determination). Where the RSSI value measured at a first AP of the minimum number of APs is not good, the BLE device is instructed to increase its transmission power to improve the RSSI value at the first AP. In some embodiments, the minimum transmission signal power for the BLE device is −75 dBm. In some embodiments, a variance of the minimum transmission signal power is relatively small, such that the standard deviation of the transmission signal power is 7 dBm.

While the example embodiments described herein relate to BLE devices, similar methodologies can be applied to other battery-powered wireless communication devices, regardless of the communication protocol employed by the battery-powered wireless communication device. In some embodiments, the BLE device(s), the AP(s), the IoT device(s), and the controller described herein comprise a processor and memory and the like.

FIG. 1 depicts an example embodiment of a location system 100, managed by a controller circuit (controller) 102, which identifies a location of the BLE device 104 based on one or more advertisements transmitted by the BLE device 104 and received by a plurality of the APs 106. The location system 100 includes a controller 102 in communication with the APs 106. In some embodiments, the controller 102 (e.g., a wireless controller such as a wireless local area network (WLAN) controller) manages communications for a plurality of APs 106, such as the APs 106a-106i.

As shown in FIG. 1, the BLE device 104 operates with a transmission power level that enables the BLE device 104 to communicate with all devices within an area 108. Thus, when the BLE device 104 transmits an advertisement, all of the APs 106a-106h receive the advertisement with different signal strength values, such as different RSSI values. In some embodiments, as introduced above, where the BLE device 104 operates with the single transmission power level, the advertisement (and other) transmissions by the BLE device 104 may create interference for other BLE and wireless devices in the area 108. Similarly, other BLE and wireless devices in the area 108 can create interference for the BLE device 104 and the APs 106. Furthermore, because the transmission by the BLE device 104 is operating at a high enough transmission power level to broadcast to the area 108, the battery of the BLE device 104 may be drained more quickly than if the BLE device 104 transmitted the advertisements at a lower power level, for example, where the area 108 would be smaller than as shown in FIG. 1.

In the system 100, the BLE device 104 is shown communicating with the AP 104a at communication 110a to obtain configuration information for the system 100. However, because the BLE device 104 communicates at a single transmission power level, all of the APs 106b-106h also receive communications 110b-h that correspond to the communication 110a. Where the APs 106b-106h do not need to receive the configuration communications 110b-110h, these communications create interference for the APs 106b-106h and other wireless devices communicating in the area 108.

Figure 2:
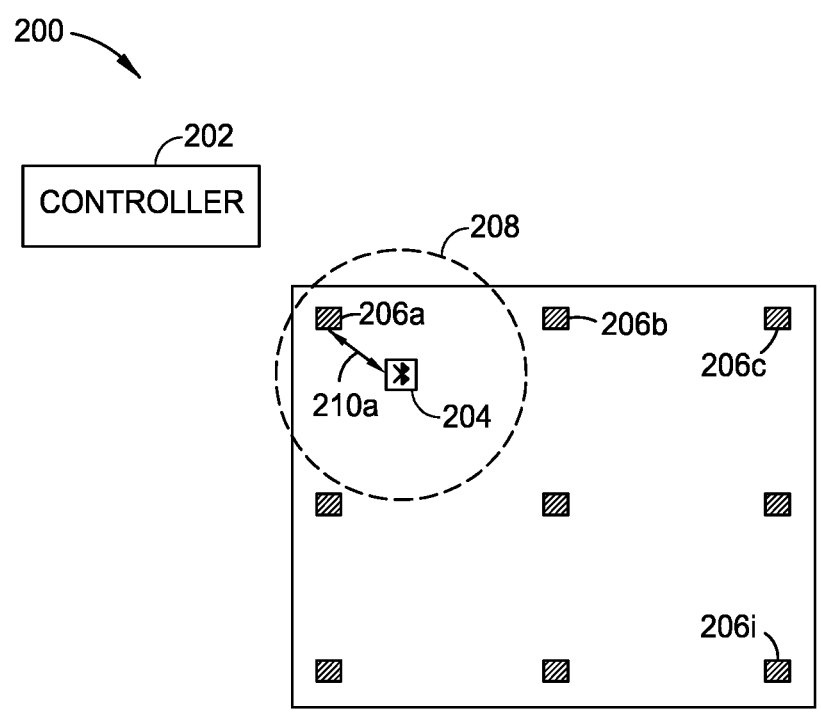
FIG. 2 depicts an example embodiment of a location system where a BLE device broadcasts advertisements at a first power level to one or more neighboring APs managed by a controller.

FIG. 2 depicts an example embodiment of a location system 200 where a BLE device 204 broadcasts communications or advertisements 110 at a first power level to one or more neighboring APs 206 managed by a controller 202.

The APs 206 may correspond to the APs 106 and the controller 202 corresponds to the controller 102. In some embodiments, the BLE device 204 may communicate with the AP 206a (or any other AP 206 of the location system 200) to register or configure the BLE device 204 for location tracking, communication, or the like, for example, at communication 210a, corresponding to communication 110a. In some embodiments, registering the BLE device 204 may occur at a predetermined transmission power level established, for example, at manufacture of the BLE device 204, identified in a beacon or other communication received by the BLE device 204 from the AP 206a, and the like. For example, the BLE device 204 identifies the existence of the location system 200 via a beacon transmitted by one or more of the APs 206. The BLE device 204 may identify in the transmitted beacon information that enables the BLE device 204 to register with the location system 200, including a requested transmission power level for the BLE device 204 to use during the registration at the communication 210a, and so forth.

In this example, the requested transmission power level for the BLE device 204 results in only the AP 206a being able to communicate with the BLE device 204. In some embodiments, the requested transmission power level may be low enough such that the BLE device 204 will only be able to communicate with a single AP 206 regardless of the location of the BLE device 204 relative to the APs 206. In some embodiments, the requested transmission power level may allow the BLE device 204 to communicate with a plurality of APs 206 dependent on the location of the BLE device 204 relative to the APs 206. The BLE device 204 may transmit with a transmission power level such that APs 206 within an area defined by area 208 receive transmissions from the BLE device 204. Thus, as shown in FIG. 2, the BLE device 204 transmits with a transmission power level such that only the AP 206a can receive transmissions from the BLE device 204 as the only AP 206 within the area 208. The remaining APs 206b-206i are unable to receive transmissions from the BLE device 204 transmitted at the transmission power level associated with the area 208. In some embodiments, the BLE device 204 may convey telemetry data regarding the BLE device 204 to the AP 206a. The telemetry data may comprise data about the communications capabilities and components of the BLE device 204. By using this reduced power level, the BLE device 204 can improve its battery life while still maintaining communications with the location system 200.

In some embodiments, each BLE device 204 transmits advertisements including an identifier for the BLE device 204. The identifier for the BLE device 204 may be unique to that BLE device 204, such as a wireless ID, a name, an address, a last identified location, and the like. The AP 206a may report the identifier for the BLE device 204 to the controller 202. In some embodiments, the AP 206a also reports an RSSI value measured for the advertisement received from the BLE device 204 to the controller 202. In this way, the controller 202 can track which BLE devices 204 are within an area or environment in which the controller 202 and the APs 206 can identify or determine corresponding locations.

In certain embodiments, the controller 202 may receive a request, for example, from a user, to identify a location of a given product or item. For example, the controller 202 may receive an identifier for the BLE device 204 from the user. The controller 202 may determine that, based on the transmission power level at which the BLE device 204 is currently transmitting, an insufficient number of APs 206 receive advertisements broadcast by the BLE device 204 to determine the location for the BLE device 204. For example, the controller 202 may know that only the AP 206a receives the advertisements broadcast by the BLE device 204 based on the RSSI value reported by the AP 206a to the controller 202 for the advertisements received from the BLE device 204 or based on no other APs 206 reporting receipt of corresponding advertisements from the BLE device 204.

Where the controller 202 determines that insufficient APs 206 receive advertisements from the BLE device 204 for which the controller 202 received the request to determine the location, the controller 202 may work with the AP 206a communicating with the BLE device 204 to improve conditions. For example, the controller 202 may cause the AP 206a to instruct the BLE device 204 to incrementally increase its transmission power level until a sufficient number of APs 206 receive the advertisements from the BLE device 204. The sufficient number of APs 206 may correspond to the minimum number of APs 206 needed to determine the location of the BLE device 204 using a particular method. In certain embodiments, the minimum number of APs 206 used to determine the location of the BLE device 204 is three using, for example, triangulation or trilateration. In some embodiments utilizing trilateration, the minimum number of APs 206 is four.

In some embodiments, the incremental increase in the transmission power level of the BLE device 204 transmitting the advertisements comprises incrementing the transmission power level by a fixed amount, a variable amount, an exponential amount, or the like. As described above, the transmission power level of the BLE device 204 is directly related to the area 208 in which the APs 206 receive the broadcast advertisements. As the transmission power level of the BLE device 204 increases, the area 208 in which the APs 206 can receive broadcast advertisements also increases. Thus, as the BLE device 204 incrementally increases its transmission power level, the area 208 in which the BLE device 204 can communicate with the APs 206 also increases, as described in more detail below with respect to FIG. 3.

Figure 3:
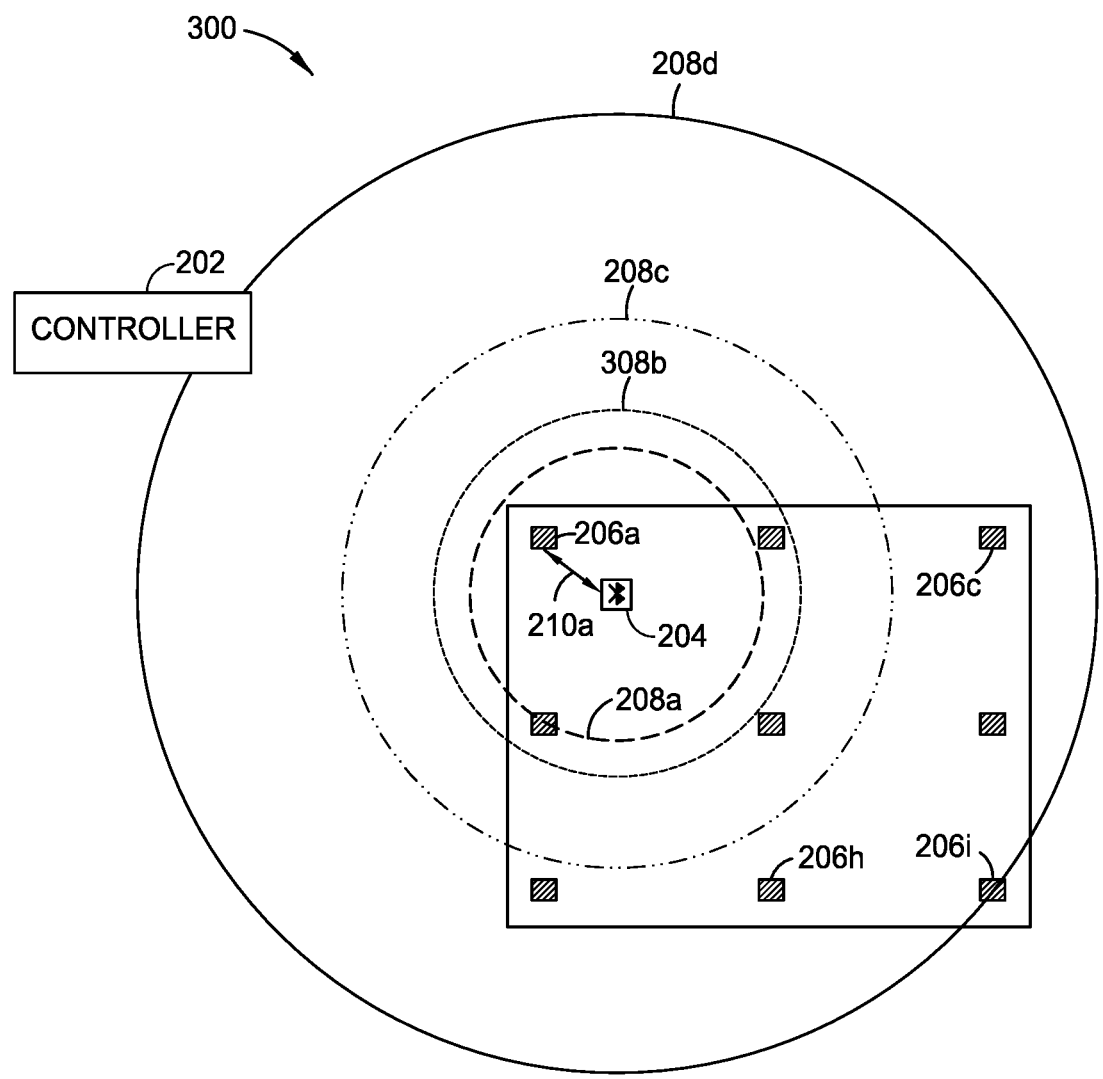
FIG. 3 depicts another example embodiment of the location system of FIG. 2, where the BLE device broadcasts advertisements to a plurality of APs at different power levels at which the BLE device transmits.

FIG. 3 depicts another example embodiment of the location system 200 of FIG. 2, where the BLE device 204 broadcasts advertisements to a plurality of APs 206 at different power levels at which the BLE device 204 transmits. The location system 200 shows different areas 208a-208d corresponding to different transmission power levels for the BLE device 204. Thus, the location system 200 shows how the different transmission power levels for the BLE device 204 can result in different APs 206 receiving the broadcast advertisements from the BLE device 204.

The location system 200 depicts four different areas 208a-208d corresponding to four different transmission power levels for simplicity and brevity of discussion. However, more or fewer different areas 208 and corresponding transmission power levels can exist for the location system 200. The area 208d may be a largest area that corresponds to a maximum transmission power for the BLE device 204, where the area 208d is the largest area shown with respect to the location system 200. The area 208d may correspond to the area 108 of FIG. 1, where the BLE device 204 transmits at, for example, a maximum power level. The area 208a depicts a minimum area that corresponds to a minimum transmission power for the BLE device 204. As described above, when the BLE device 204 is transmitting at the minimum power level, such as after registering with the AP 206a; thus, the area 208a may correspond to the area 208 of FIG. 2.

Between the maximum area 208d and the minimum area 208a, the location system 200 shows two additional representative areas, 208b and 208c. With the area 208b, the BLE device 204 transmits or broadcasts advertisements with or at a corresponding transmission power level. The corresponding transmission power level may be incrementally higher than the minimum transmission power level that generates the minimum area 208a. At the transmission power level corresponding to the area 208b, the broadcast advertisements are received by two APs 206b and 206d in addition to the AP 204a that also receives the broadcast advertisements at the minimum transmission power level.

At another incrementally increased transmission power level, the BLE device 204 may broadcast advertisements to an area 208c, which is larger than the areas 208a and 208b but smaller than the area 208d. At this corresponding transmission power level, the BLE device 204 can broadcast its advertisements to a fourth AP 206e in addition to the AP 206a that receives advertisements in the area 208a and area 208b as well as the APs 206b and 206d that receive advertisements in the area 208b.

In some embodiments, the differences between the transmission power levels corresponding to the area 208a and 208b may be one or incremental transmission power level increases. For example, when the controller 202 causes the AP 206a to instruct the BLE device 204 to increase its transmission power level from the minimum transmission power level corresponding to the area 208a, the incremented transmission power level may correspond to the area 208b. Similarly, the difference between the transmission power levels corresponding to the areas 208b and 208c may be one or incremental transmission power level increases, and the difference between the transmission power levels corresponding to the areas 208c and 208d may be one or incremental transmission power level increases.

Figure 4:
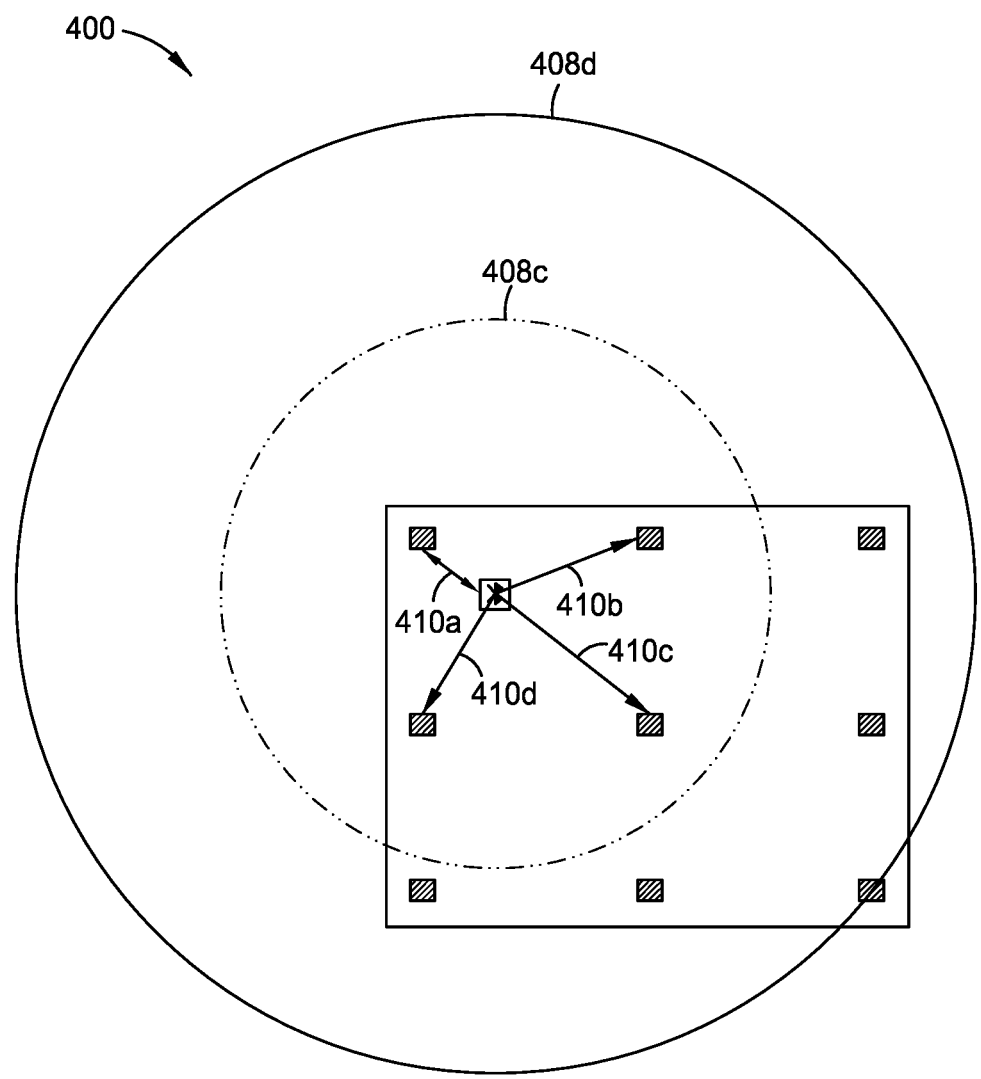
FIG. 4 depicts another example embodiment of the location system of FIG. 2, where the BLE device broadcasts advertisements to four APs of the location system.

When the BLE device 204 is transmitting at the transmission power level corresponding to the area 208c where the four APs 206a, 206b, 206d, and 206e receive advertisements broadcast by the BLE device 204, the controller 202 receives reports from each of the APs 206a, 206b, 206d, and 206e reporting one or more parameters of the received advertisements, such as corresponding RSSI values measurement by the APs 206a, 206b, 206d, and 206e, and the like. The controller 202 can use the received reports to determine the location of the BLE device 204, which can then be provided to the requesting user, to the BLE device 204, and so forth. FIG. 4 below shows details of the broadcast advertisement received by the APs 206a, 206b, 206d, and 206e that enables the controller 202 to determine the location of the BLE device 204.

FIG. 4 depicts another example embodiment of the location system 200 of FIG. 2, where the BLE device 204 broadcasts advertisements to four APs 206a, 206b, 206d, and 206e of the location system 200. The BLE device 204 communications via, for example, the broadcast advertisements, with the APs 206a, 206b, 206d, and 206e are shown with communications 410a, 410b, 410c, and 410d, respectively. Specifically, the communication 410a between the BLE device 204 and the AP 206a, which may correspond to the communication 110 of FIG. 1, may also or instead comprise the advertisement broadcast by the BLE device 204 or instructions from the AP 206a to the BLE device 204 to incrementally increase the transmission power level at which the BLE device 204 broadcasts the advertisements. The communication 410b exists between the BLE device 304 and the AP 206b, where the AP 206b receives the advertisement broadcast by the BLE device 204. The communication 410c exists between the BLE device 204 and the AP 206d, where the AP 206d receives the advertisement broadcast by the BLE device 204. The communication 410d exists between the BLE device 204 and the AP 206e, where the AP 206e receives the advertisement broadcast by the BLE device 204.

The APs 206a, 206b, 206d, and 206e may communicate or report receipt of the advertisements from the BLE device 204 to the controller 202 along with details of the receipt, such as the RSSI value measured for the received advertisements or one or more other parameters regarding the received advertisements. Where the one or more parameters include signal strength information, the controller 202 may use trilateration, triangulation, or the like, to determine the location of the BLE device 204. Where the one or more parameters include timing information, the controller 202 may use triangulation to determine the location of the BLE device 204.

In some embodiments, the controller 202 determines the location of the BLE device 204 based on the reports from the threshold number of APs 206 or that the location of the BLE device 204 is no longer requested. The controller 202 may then cause the AP 206a (or any other AP 206b, 206d, or 206e receiving advertisements from the BLE device 204) to instruct the BLE device 204 to incrementally or immediately reduce its transmission power level. The BLE device 204 may be instructed to reduce its transmission power level back to the minimum transmission power level (associated with the area 208a) or another transmission power level at which the BLE device 204 communicates with fewer APs 206 than the threshold number of APs 206. In some embodiments, after reducing its transmission power level, the BLE device 204 advertisements are only received by a single AP 206. In this way, the BLE device 204 can conserve power and create less interference for other devices when its location is not being determined or requested.

Further details of the communications between the APs 206 and the BLE device 204 to enable the controller 202 to identify the location of the BLE device 204 are provided below with respect to FIG. 5.

Figure 5:
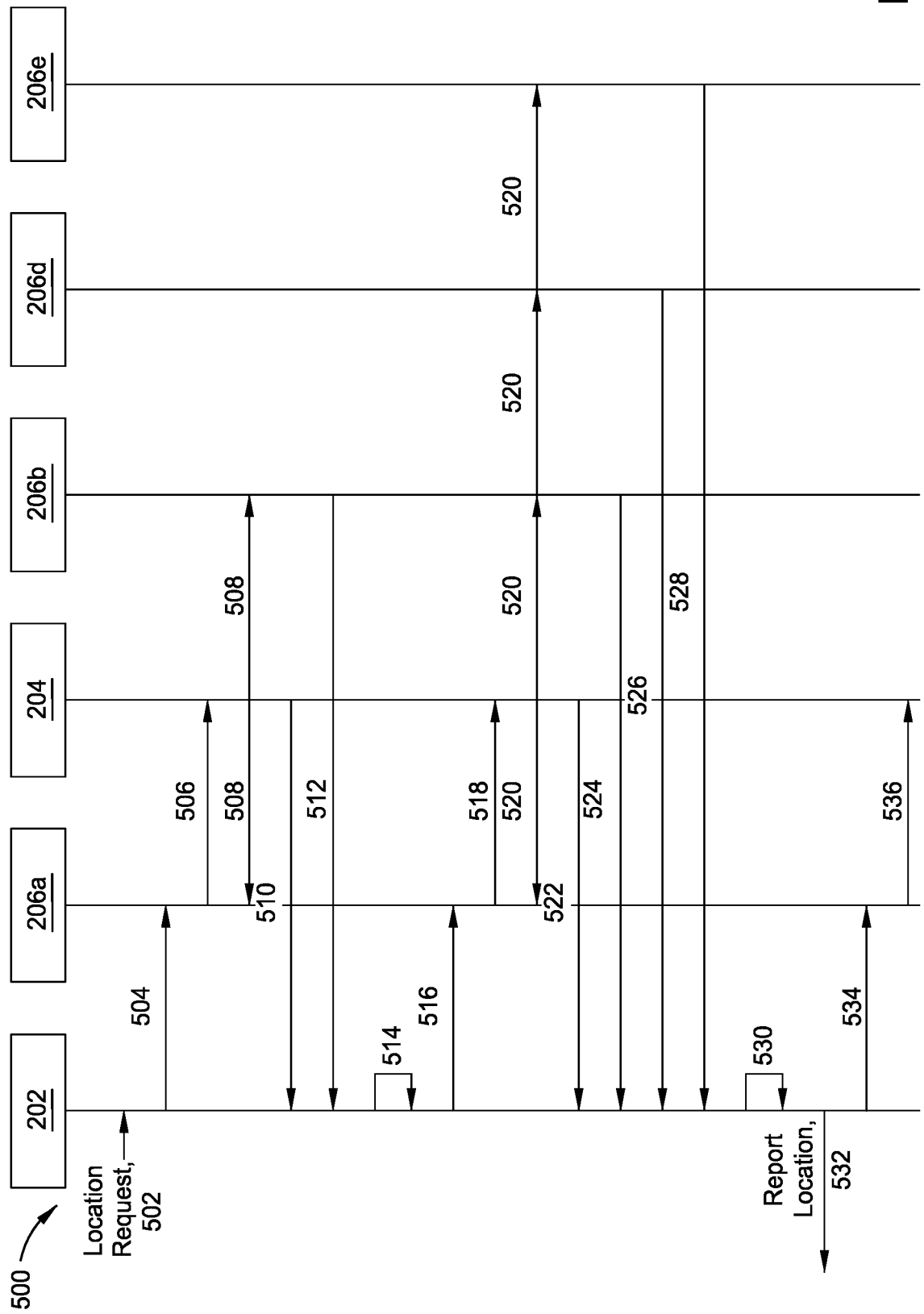
FIG. 5 depicts a communication flow diagram between components of the location system of FIG. 2 and the BLE device that enables a controller to identify the location of the BLE device, according to an embodiment described herein.

FIG. 5 depicts a communication flow diagram 500 between components of the location system 200 of FIG. 2 and the BLE device 204 that enables the controller 202 to identify the location of the BLE device 204, according to an embodiment described herein.

The flow diagram 500 begins with communication 502, where the controller 202 receives the request to determine or monitor the location of the BLE device 204. In some embodiments, the request is received from a user while the BLE device 204 is moving or since the BLE device 204 initially registered and configured with the AP 206a. Thus, the controller 202 may communicate with the AP 206 that most recently reported receiving the advertisement broadcast from the BLE device 204 which has the identifier for which the location was requested by the user. For the discussion below, the controller 202 communicates with the AP 206a as the AP 206a in communication with the BLE beacon 204.

At communication 504, the controller 202 instructs the AP 206a to ask the BLE device 204 to transmit an advertisement at a first power level. In some embodiments, the first power level may be the power level used to register and configure the BLE device 204 with the AP 206a. In some embodiments, the first power level may comprise an incremented power level from the minimum power level used to register the BLE device 204 with the AP 206a. In some embodiments, instead of asking the BLE device 204 to transmit the advertisement at any particular power level, the AP 206a asks the BLE device 204 to increment its transmission power level by a given amount or to a given power level.

At communication 506, the AP 206a transmits the instruction to the BLE device 204 to transmit the advertisement at the incremented power level.

At communication 508, the BLE device 204 transmits the advertisement at the (incrementally or otherwise) increased transmission power level. Because this transmission power level is increased over the minimum power level (or because the BLE device 204 has moved since registering with the AP 206a), the advertisement in the communication 508 is transmitted to the AP 206a and the AP 206b.

At communication 510, the AP 206a reports to the controller 202 one or more parameters of the advertisement received from the BLE device 204. In some embodiments, the one or more parameters may be the RSSI value of the advertisement received by the AP, a transmission power level of the advertisements, and the like. Similarly, at communication 512, the AP 206b reports to the controller 202 one or more parameters of the advertisement it received from the BLE device 204, where the one or more parameters correspond to the one or more parameters reported by the AP 206a. In some embodiments, the RSSI values of the advertisements received by the AP 206a and the AP 206b are different from each other.

At processing 514, the controller 202 identifies the number of APs 206 that received the advertisement from the BLE device 204 transmitted at the first power level. If the controller 202 determines that the number of APs 206 (here, two) is less than the threshold number of APs 206 (for example, four), then the controller 202 may generate an instruction to the AP 206a (or the AP 206b) to cause the BLE device 204 to incrementally increase its transmission power level again and then again broadcast the advertisement. At communication 516, the controller 202 transmits the generated instruction to the AP 206a.

At communication 518, the AP 206a transmits updated instructions to the BLE device 204, requesting that the BLE device 204 again increment its transmission power level and broadcast the advertisement, similar to communication 504 above.

At communication 520, the BLE device 204 broadcasts the advertisement with the again incremented transmission power level. Because this transmission power level is increased over the previous power level (now corresponding to the area 208b), or because the BLE device 204 has moved since broadcasting the advertisement at communication 508, the advertisement broadcast at communication 520 is transmitted to the AP 206a, the AP 206b, the AP 206d, and the AP 206e.

At communication 522, the AP 206a reports to the controller 202 the one or more parameters of the advertisement received from the BLE device 204, as described above with respect to communication 510. Similarly, at communications 524, 526, and 528, the APs 206b, 206d, and 206e, respectively, report to the controller 202 the one or more parameters of the advertisement they received from the BLE device 205, similar to the communication 512 described above.

At processing 530, the controller 202 identifies the number of APs 206 that received the advertisement from the BLE device 204 transmitted at the first power level. If the controller 202 determines that the number of APs 206 (here, four) is equal to or greater than the threshold number of APs 206 (for example, three or four), then the controller 202 may perform trilateration (or another or similar processing) to determine the location of the BLE device 204. In some embodiments, the controller 202 again determines that the number of APs 206 that received the advertisement does not match or exceed the threshold or that not all of the threshold number of APs 206 received the advertisement with the minimum RSSI value (or other parameter). Accordingly, the controller 202 may generate another instruction to the AP 206a (or another AP 206 that received the most recent advertisement) to cause the BLE device 204 to again incrementally increase its transmission power level and then again broadcast the advertisement. If the transmission power level is incrementally increased, the steps 516-530 can be repeated until the number of APs 206 reporting receipt of the advertisement from the BLE device 204 (and the corresponding RSSI values) is greater than or equal to the threshold.

At communication 532, the controller 202 may report the location of the BLE device 204 to the requesting user. In some embodiments, the controller 202 also reports the location to the BLE device 204.

At communication 534, the controller 202 may instruct the AP 206a (or any one of the APs 206 that received the last advertisement broadcast by the BLE device 204) to instruct the BLE device 204 to reduce its transmission power (incrementally or directly) to the minimum transmission power level or to a predetermined transmission power level. The AP 206a may transmit such an instruction to the BLE device 204 at communication 536.

In some embodiments, the transmission power used by the BLE device 204 is determined based on a density of the APs 206 in the environment. For example, where the AP 206 density is high, the transmission power used by the BLE device 204 is lower than when the AP 206 density is low. Furthermore, the transmission used by the BLE device 204 may be determined based on where the BLE device 204 is located relative to the APs 206, such as in or as part of an edge network.

By adjusting its transmission power level based on circumstances, environmental conditions, and the like, the BLE device 204 can reduce its power expenditure until needed. For example, since the BLE device 204 broadcasts advertisements to provide data to the APs 206, reducing the transmission power for the broadcasts enables the BLE device 204 to save power and extend a battery life. In some embodiments, the BLE device 204 can further increase an interval between consecutive advertising intervals, for example, from 100 milliseconds to 1 second, which can also reduce the power consumption of the BLE device 204. In some embodiments, the BLE device 204 receives instructions to increase or decrease its transmission power level, for example, from another BLE device or from an AP 206. In response to the instructions, the BLE device 204 transmits an acknowledgement to the device that requests the increase or decrease.

As described above, the BLE device 204 may communicate with the AP 206a (or any other AP 206 of the location system 200) to register or configure the BLE device 204 for location tracking, communication, or the like, for example, at communication 210a. In some embodiments, after the BLE device 204 registers with the AP 206a, the BLE device 204 may maintain communications at the same transmission power level as indicated by the area 208b. Similarly, other BLE devices (not shown) may also operate at low transmission power levels such that only one or a minimal number of APs 206 are receiving broadcast transmissions from the other BLE devices.

As shown, the requested transmission power level for the BLE device 204 results in only the AP 206a being able to communicate with the BLE device 204. In some embodiments, the requested transmission power level may be low enough such that the BLE device 204 will only be able to communicate with a single AP 206 regardless of the location of the BLE device 204 relative to the APs 206. In some embodiments, the requested transmission power level may allow the BLE device 204 to communicate with a plurality of APs 206 dependent on the location of the BLE device 204 relative to the APs 206. The BLE device 204 may transmit with a transmission power level such that APs 206 within an area defined by area 208 receive transmissions from the BLE device 204. Thus, as shown in FIG. 2, the BLE device 204 transmits with a transmission power level such that only the AP 206a can receive transmissions from the BLE device 204 as the only AP 206 within the area 208. The remaining APs 206b-206i are unable to receive transmissions from the BLE device 204 transmitted at the transmission power level associated with the area 208. In some embodiments, the BLE device 204 may convey telemetry data regarding the BLE device 204 to the AP 206a. The telemetry data may comprise data about the communications capabilities and components of the BLE device 204, sensor data (such as temperature data, light data, and so forth), advertisements, advertisement or beacon profiles, or advertisement or beacon protocols, and the like.

Figure 6:
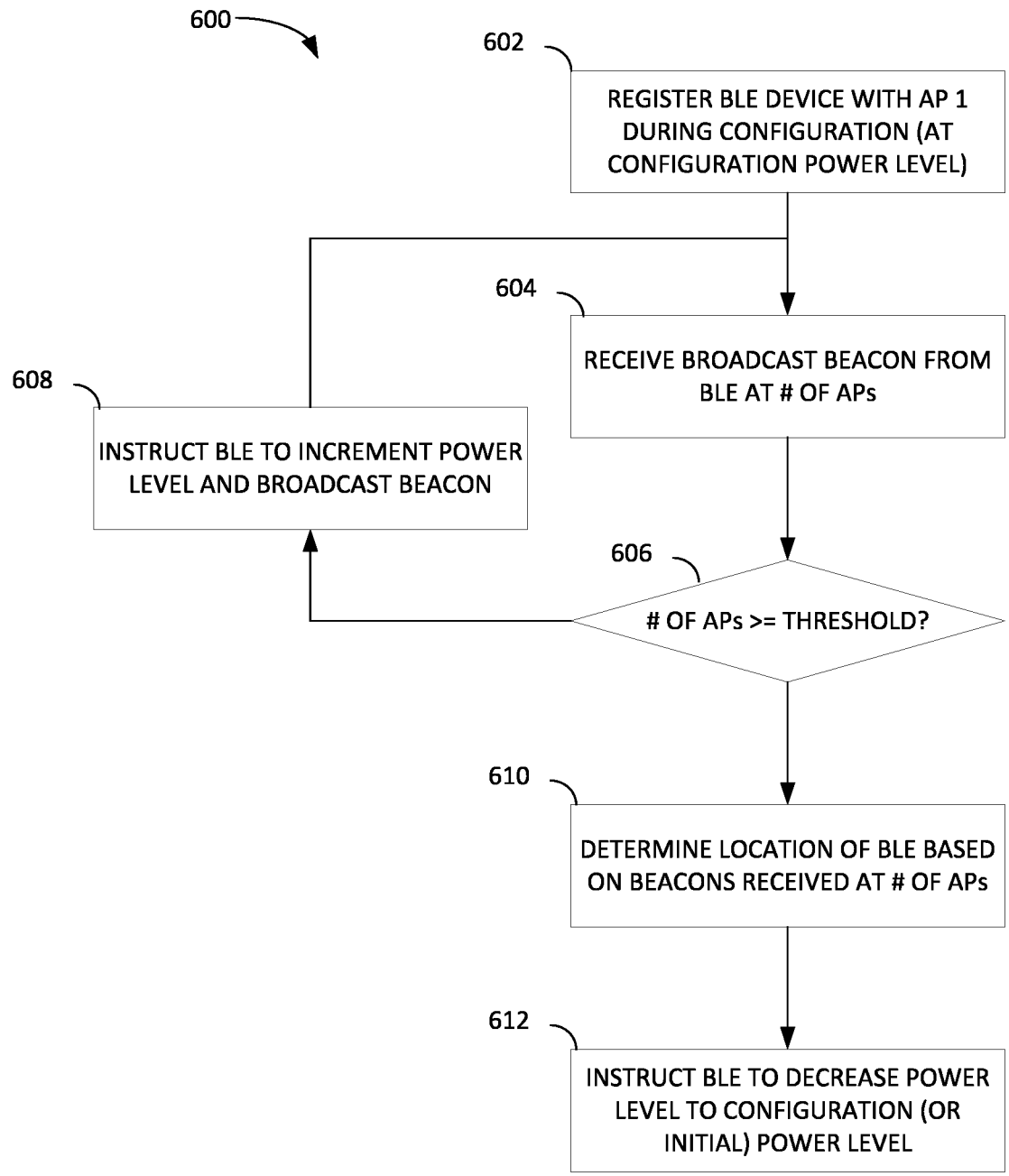
FIG. 6 depicts a flow chart of the process for incrementally increasing the transmission power level of the BLE device until the threshold number of APs of the location system of FIG. 2 receives the periodic advertisement to enable the controller to determine the location of the BLE device.

FIG. 6 depicts a flow chart of the process 600 for incrementally increasing the transmission power level of a BLE device until a threshold number of APs of a location system (such as the location system 200 of FIG. 2) receives the periodic advertisement to enable a controller to determine a location of the BLE device. While the flow chart of the process 600 and corresponding description include reference to components of the location system 200 of FIG. 2, the blocks of the process 600 are not limited to that example embodiment and may apply to various other combinations of components. Furthermore, the process 600 is not required to perform each of or only the shown blocks and is not limited to performing the indicated blocks in any particular order.

At block 602, the process 600 includes registering the BLE device with the location system via one or more APs of the location system. In some embodiments, registering the BLE device with the one or more APs comprises receiving and responding to a beacon transmitted by the APs of the location system. The beacon may indicate to the BLE device an expected or requested transmission power level for the BLE device to set as default for use when communicating with the one or more APs of the location system. The requested transmission power level may be set to a value such that only one or a minimal number of APs of the location system can receive broadcasts from the BLE device when the BLE device is located anywhere in an environment served by the location system.

At block 604, the process 600 comprises one of the APs of the location system receiving a broadcast advertisement or beacon from the BLE device. In some embodiments, the advertisement is broadcast in response to one AP requesting the BLE device to broadcast the advertisement to enable the location system to identify a location of the BLE device, as described herein. Where the request to the BLE device to broadcast the advertisement includes a requested or incremented transmission power level, or indication to increment the BLE device transmission power level, the BLE device may increment its transmission power level or broadcast the advertisement at the indicated transmission power level. The broadcast advertisement will be received by any AP within an area corresponding to the transmission power level of the BLE device, as described above.

At block 606, the process 600 comprises determining whether the number of APs that receive the broadcast advertisement from the BLE device at block 604 meets or exceeds a threshold number of APs. In some embodiments, the threshold number of APs is set based on the number of APs required to receive the broadcast advertisement to mathematically identify the location of the BLE device (for example, three or four APs to use trilateration or triangulation methods to identify the location of the BLE device). In certain embodiments, the threshold number of APs may be dynamically set or predetermined for all use cases. In some embodiments, determining whether the threshold number of APs receive the broadcast advertisement also comprises determining whether the RSSI for the broadcast advertisement received by each AP meets or exceeds a threshold RSSI. Thus, not only will a threshold number of APs receive the broadcast advertisement to determine the location of the BLE device, the threshold number of APs will receive the broadcast advertisement with at least the threshold RSSI. In some embodiments, the controller of the location system performs the check of the number of receiving APs based on reports of advertisement receipt from each AP of the location system.

At block 608, where the number of APs receiving the advertisement (or the number of APs receiving the advertisement with the threshold RSSI) does not meet or exceed the corresponding threshold, the process 600 instructs the BLE device to increment its transmission power level. As introduced above, such incrementing can be an increment to a predetermined higher transmission power level, an increment by a predetermined amount, an increment by or to a dynamically calculated amount, and so forth. In some embodiments, the controller may generate and transmit instructions to the one or more APs communicating (for example, receiving the broadcast advertisement of) the BLE device to instruct the BLE device to increment its transmission power level. The one or more APs may then transmit corresponding instructions to the BLE device to increment its transmission power level and rebroadcast an advertisement at the incremented transmission power level.

In some embodiments, though not shown, the process 600, as part of the block 606 or separately, determines whether the number of APs that receive the broadcast advertisement received with broadcast advertisement with threshold parameters, such as the threshold RSSI introduced herein. Where the threshold number of APs did not receive the broadcast advertisement with the threshold parameters, the proceeds to the block 608 as introduced.

At block 610, where the number of APs receiving the advertisement (or the number of APs receiving the advertisement with the threshold RSSI) does meet or exceed the corresponding threshold, the process 600 uses the reports from the number of APs receiving the broadcast advertisements from the BLE device to determine the location of the BLE device. For example, the reports from the APs to the controller include the RSSI or timing data associated with the received advertisements, the controller may employ trilateration or triangulation or similar corresponding methods to determine the location of the BLE device with respect to the APs, and so forth.

At block 612, the process 600 comprises instructing the BLE device to decrease or reset its transmission power level to a configured or preset transmission power level, for example, via decrements of the transmission power level or an immediate reduction of the transmission power level to the configured level. In some embodiments, where large changes in the transmission power level negatively impact interference and other aspects or other devices in the location system, the APs and controller instruct the BLE device to reduce the transmission power level gradually. In some embodiments, the controller may provide the location of the BLE device to the BLE device so the BLE device can broadcast its location (or last calculated location) in its advertisement, for example, with a time of when the location was last calculated. In this way, the BLE device can provide its location to devices that are unable to perform the corresponding calculations or without requiring increases in power transmission levels. In some embodiments, the controller provides the location of the BLE device to a requesting entity, such as a user, and so forth. In some embodiments, the blocks 604-608 of the process 600 are repeated until the number of APs that receive the broadcast advertisement from the BLE device exceeds the threshold number (and the corresponding threshold RSSI). Thus, the controller, APs, and BLE device work together to enable the BLE device to incrementally increase its transmission power level from a low, energy saving transmission power level to a higher transmission power level where the location of the BLE device can be determined to increase a battery life of the BLE device. By enabling just increasing and decreasing of the transmission power level for the BLE device, the BLE can reduce transmission power until a high transmission power level is requested, which will extend the battery life of the BLE device because high transmission power levels result in shorter battery life.

Figure 7:
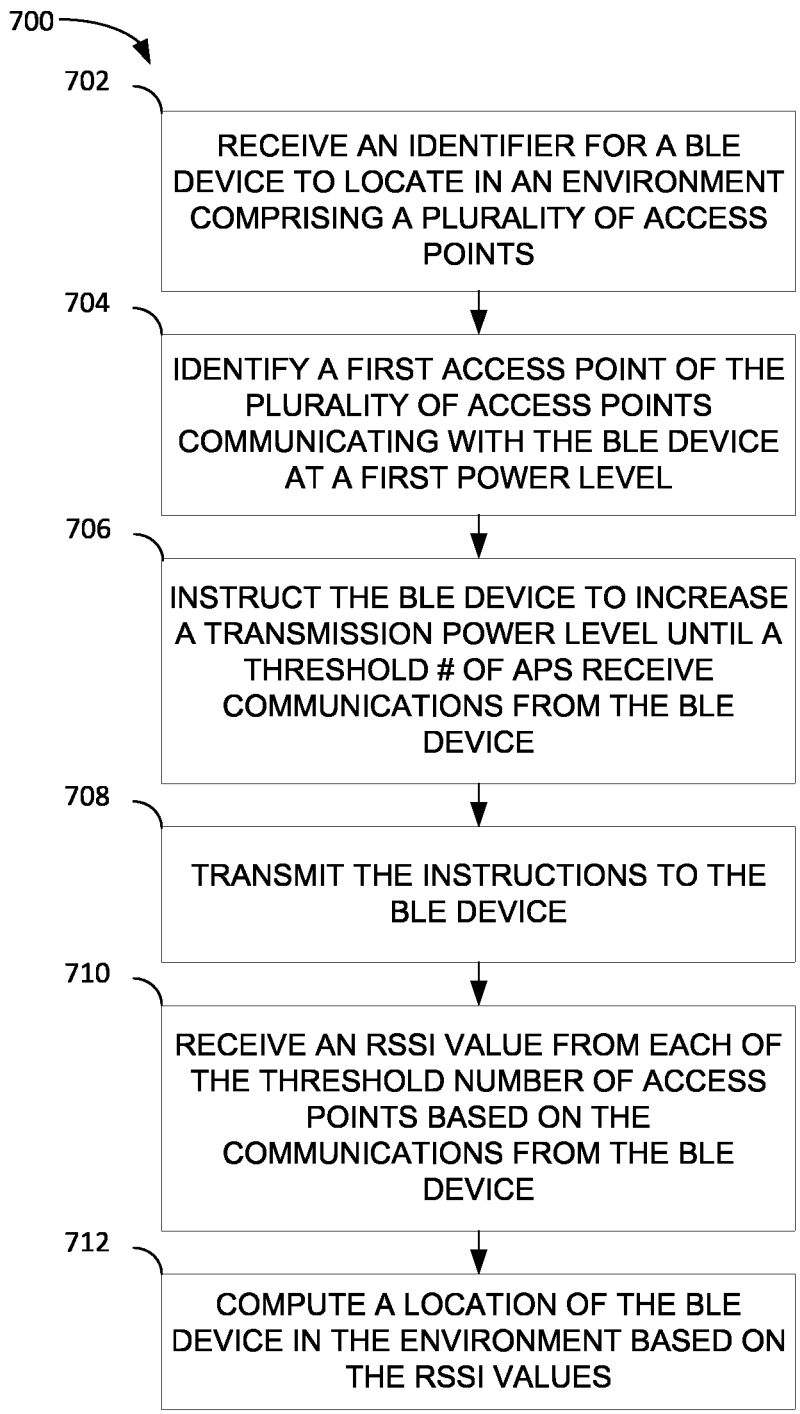
FIG. 7 is a flowchart of a method for locating a BLE device by varying a transmission power level of the BLE device when broadcasting advertisements, according to aspects described herein.

FIG. 7 is a flow chart of a method 700 for locating a BLE device via a location system, such as the location system 200 of FIG. 2, by varying a transmission power level of the BLE device when broadcasting advertisements, according to aspects described herein. While the flow chart of the method 700 and corresponding description include reference to components of the location system 200 of FIG. 2, the blocks of the method 700 are not limited to that example embodiment and may apply to various other combinations of components. Furthermore, the method 700 is not required to perform each of or only the shown blocks and is not limited to performing the indicated blocks in any particular order.

At block 702, the method 700 comprises receiving an identifier for a BLE beacon to locate in an environment comprising a plurality of access points. In some embodiments, the controller receives the identifier from a requesting user or entity. In response to receiving the identifier, the controller determine whether the identified BLE device is communicating with the location system, for example, by searching a database of BLE devices communicating with the location system for the received identifier. In some embodiments, each device communicating with one or more APs of the location system has a corresponding identifier and communicating AP identifier stored in the database. The database may be updated based on the determined location of the BLE device and the AP(s) that received the most receive broadcast advertisement from the BLE device, and so forth.

At block 704, the method 700 comprises identifying or detecting the AP communicating with the BLE device at a first or default transmission power level, where the first transmission power level results in a single or a minimum number of APs receiving advertisements from the BLE device.

At block 706, the method 700 comprises the controller generating instructions to the BLE device (via the AP communicating with the BLE device) to incrementally increase a transmission power level of the BLE device and rebroadcast advertisements until a threshold number of APs receives the advertisements broadcast by the BLE device. In some embodiments, the controller instructs the BLE device to incrementally increase the transmission power level until the RSSI for each of the received advertisements meets a threshold RSSI. In some embodiments, the BLE device goes through one or more iterations of incrementing the transmission power level.

At block 708, the method 700 comprises the controller transmitting the instructions to the AP(s) communicating with the BLE device, which transmit(s) corresponding instructions to the BLE device. In some embodiments, the blocks 706 and 708 are repeated until the threshold number of APs or the threshold RSSI for the threshold number of APs is met.

At block 710, the method 700 comprises, once the threshold number of APs or the threshold number of APs and the threshold RSSI are met, the controller receiving the RSSI values (or corresponding timing values) from each of the threshold number of APs to determine the location of the BLE device.

At block 712, the method 700 comprises computing the location of the BLE device by one or more of the controller, the APs, and so forth. The controller then reports the computed location to the requesting user, the BLE device, the APs, or so forth.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered an element or limitation of the appended claims except where explicitly recited in a claim(s).

As will be appreciated by one skilled in the art, the embodiments disclosed herein may be embodied as a system, method or computer program product.

Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:
1. A method, comprising:
receiving an identifier for a Bluetooth Low Energy (BLE) device to locate in an environment comprising a plurality of access points (APs);

identifying a first AP of the plurality of APs communicating with the BLE device at a first power level;

instructing, using the first AP, the BLE device to increase a transmission power level of the BLE device until a threshold number of APs of the plurality of APs, including the first AP, receive communications from the BLE device;

receiving an RSSI value from each of the threshold number of APs based on the communications from the BLE device; and computing a location of the BLE device in the environment based on the RSSI values.

2. The method of claim 1, wherein instructing the BLE device to increase a transmission power level comprises instructing, using the first AP, the BLE device to increase the transmission power level of the BLE device until:

the threshold number of APs of the plurality of APs, including the first AP, receive the communications from the BLE device at a threshold RSSI value; or the transmission power level of the BLE device is equal to a maximum power level for the BLE device.

3. The method of claim 2, wherein instructing the BLE device comprises:

generating an instruction to the BLE device to increment the transmission power level of the BLE device by an increment amount;

detecting a number of APs of the plurality of APs that report receipt of the communications from the BLE device at an incremented transmission power level; and comparing the incremented transmission power level of the BLE device to the maximum power level for the BLE device, until:

the number of APs that report receipt is equal to or exceeds the threshold number of APs; and the incremented transmission power level is equal to a maximum power level for the BLE device.

4. The method of claim 1, wherein the threshold number of APs is four APs.

5. The method of claim 1, wherein the RSSI value received from each of the threshold number of APs is measured based on a communication received by each of the threshold number of APs transmitted by the BLE device at the transmission power level.

6. The method of claim 1, wherein each of the RSSI values is greater than or equal to a threshold RSSI value.

7. The method of claim 1, further comprising identifying a maximum power level of the BLE device based on a registration information of the BLE device.

8. The method of claim 1, wherein generating instructions to the BLE device comprises:

generating an instruction to the BLE device to increase the transmission power level of the BLE device to a predetermined transmission power level; and detecting a number of APs of the plurality of APs that report receipt of the communications from the BLE device at the predetermined transmission power level.

9. The method of claim 1, further comprising generating additional instructions to the BLE device to reset the transmission power level to the first power level after the location of the BLE device is computed.

10. A wireless controller, comprising one or more processors and a memory storing instructions that, when executed by the one or more processors, cause the wireless controller to perform an operation, the operation comprising:

receiving a request to locate a Bluetooth low energy (BLE) device in an area;

identifying a first access point (AP) that is communicating with the BLE device while the BLE device is transmitting at a first power level;

instructing, via the first AP, the BLE device to increase a transmission power level of the BLE device until a threshold number of APs, including the first AP, receive communications from the BLE device; and computing a location of the BLE device in the area based on the communications.

11. The wireless controller of claim 10, wherein instructing the BLE device to increase a transmission power level comprises instructing, using the first AP, the BLE device to increase the transmission power level of the BLE device until:

the threshold number of APs, including the first AP, receive the communications from the BLE device at a threshold RSSI value; or the transmission power level of the BLE device is equal to a maximum power level for the BLE device.

12. The wireless controller of claim 11, wherein instructing the BLE device comprises:

generating an instruction to the BLE device to increment the transmission power level of the BLE device by an increment amount;

detecting a number of APs that report receipt of the communications from the BLE device at an incremented transmission power level; and comparing the incremented transmission power level of the BLE device to the maximum power level for the BLE device, until:

the number of APs that report receipt is equal to or exceeds the threshold number of APs; and the incremented transmission power level is equal to a maximum power level for the BLE device.

13. The wireless controller of claim 10, wherein the threshold number of APs is four APs.

14. The wireless controller of claim 10, wherein an RSSI value received from each of the threshold number of APs is measured based on a communication received by each of the threshold number of APs transmitted by the BLE device at the transmission power level.

15. The wireless controller of claim 14, wherein each of the RSSI values is greater than or equal to a threshold RSSI value.

16. The wireless controller of claim 10, further comprising identifying a maximum power level of the BLE device based on a registration information of the BLE device.

17. The wireless controller of claim 10, wherein generating instructions to the BLE device comprises:

generating an instruction to the BLE device to increase the transmission power level of the BLE device to a predetermined transmission power level; and detecting a number of APs that report receipt of the communications from the BLE device at the predetermined transmission power level.

18. The wireless controller of claim 10, further comprising generating additional instructions to the BLE device to reset the transmission power level to the first power level after the location of the BLE device is computed.

19. A Bluetooth Low Energy (BLE) device, comprising one or more processors and a memory storing instructions that, when executed by the one or more processors, cause the BLE device to perform an operation, the operation comprising:

communicating with a first access point (AP) at a first transmission power level;

receiving an instruction from the first AP to increase a transmission power level until a threshold number of APs, including the first AP, receive communications from the BLE device, wherein the communications are used to identify a location of the BLE device; and increasing the transmission power level until the threshold number of APs, including the first AP, receive the communications from the BLE device and the location of the BLE device is identified.

20. The BLE device of claim 19, further comprising:

receiving an instruction from the one of the threshold number of APs to incrementally decrease the transmission power level to the first transmission power level; and incrementally decreasing the transmission power level to the first transmission power level after the location of the BLE device is computed.

* * * * *